United States Patent [19]

Brauner et al.

[11] Patent Number: 5,360,345
[45] Date of Patent: Nov. 1, 1994

[54] AUDIO INSTRUCTION BOARD

[75] Inventors: Arne H. Brauner, Minnetonka; James E. Kelley, Minneapolis, both of Minn.

[73] Assignee: General Mills, Inc., Minneapolis, Minn.

[21] Appl. No.: 942,241

[22] Filed: Sep. 9, 1992

[51] Int. Cl.⁵ .............................................. G09B 5/06
[52] U.S. Cl. .................................................... 434/308
[58] Field of Search ......................... 446/397; 40/455; 434/219, 308, 309, 319, 321, 311, 317

[56] References Cited

U.S. PATENT DOCUMENTS

| | | | |
|---|---|---|---|
| 3,808,707 | 5/1974 | Fink | 434/252 |
| 4,222,188 | 9/1980 | Tarrant et al. | 40/152.1 |
| 4,541,028 | 9/1985 | Johnson | 40/455 X |
| 4,541,188 | 9/1985 | Sadorus | 40/455 X |
| 4,541,805 | 9/1985 | Weaver et al. | 434/95 |
| 4,639,225 | 1/1987 | Washizuka | 434/308 |
| 4,651,613 | 3/1987 | Harrison | 434/311 X |
| 4,732,072 | 3/1988 | Garlock | 84/470 R |
| 4,856,213 | 8/1989 | Hord | 40/455 X |
| 4,866,865 | 9/1989 | Yang | 40/455 |
| 4,934,079 | 6/1990 | Hoshi | 40/427 |
| 4,936,780 | 6/1990 | Cogliano | 446/397 X |
| 5,063,698 | 11/1991 | Johnson et al. | 40/455 X |

*Primary Examiner*—Paul J. Hirsch
*Assistant Examiner*—Jeffrey A. Smith
*Attorney, Agent, or Firm*—L. MeRoy Lillehaugen; John A. O'Toole; Alan D. Kamrath

[57] ABSTRACT

An instruction board (10) is disclosed providing multiple pictorial presentations (76) in a column, with each including written presentations (78, 80) and voice modules (60) in two languages such as Spanish and English. The pictorial and written presentations (76, 78, 80) are printed on a thin, flexible, and water resistant label (14) secured to the front (16) of a hollow body (12) and extending over and sealing speaker and switch openings (38, 40). Voice modules (60) in the form of panels are mounted by their opposite peripheral edges by strips (66) of double sided adhesive foam tape such that the label (14) vibrates by the air movement within the hollow body (12) by the vibration of the speaker (64) of the voice module (60). The switch openings (40) are generally U-shaped defining a lever (44) integrally extending from the front (16) and terminating in a head (42) carrying a relatively rigid spacer (46) which engages and actuates a switch (62) of the voice module (60) when the head (42) is pivoted about the lever (44) by the deflection of the label (14) into the switch opening (40). The back of the hollow body (12) is formed by first and second back panels (20, 22) which integrally terminate in L-shaped extensions (26), with spacers (32) formed by adhered layers (34) of corrugated cardboard secured to the free leg (30) of the extensions (26) and acting as an anvil for the relatively rigid spacers (46) sandwiching the switches (62) of the voice modules (60) therebetween.

20 Claims, 5 Drawing Sheets

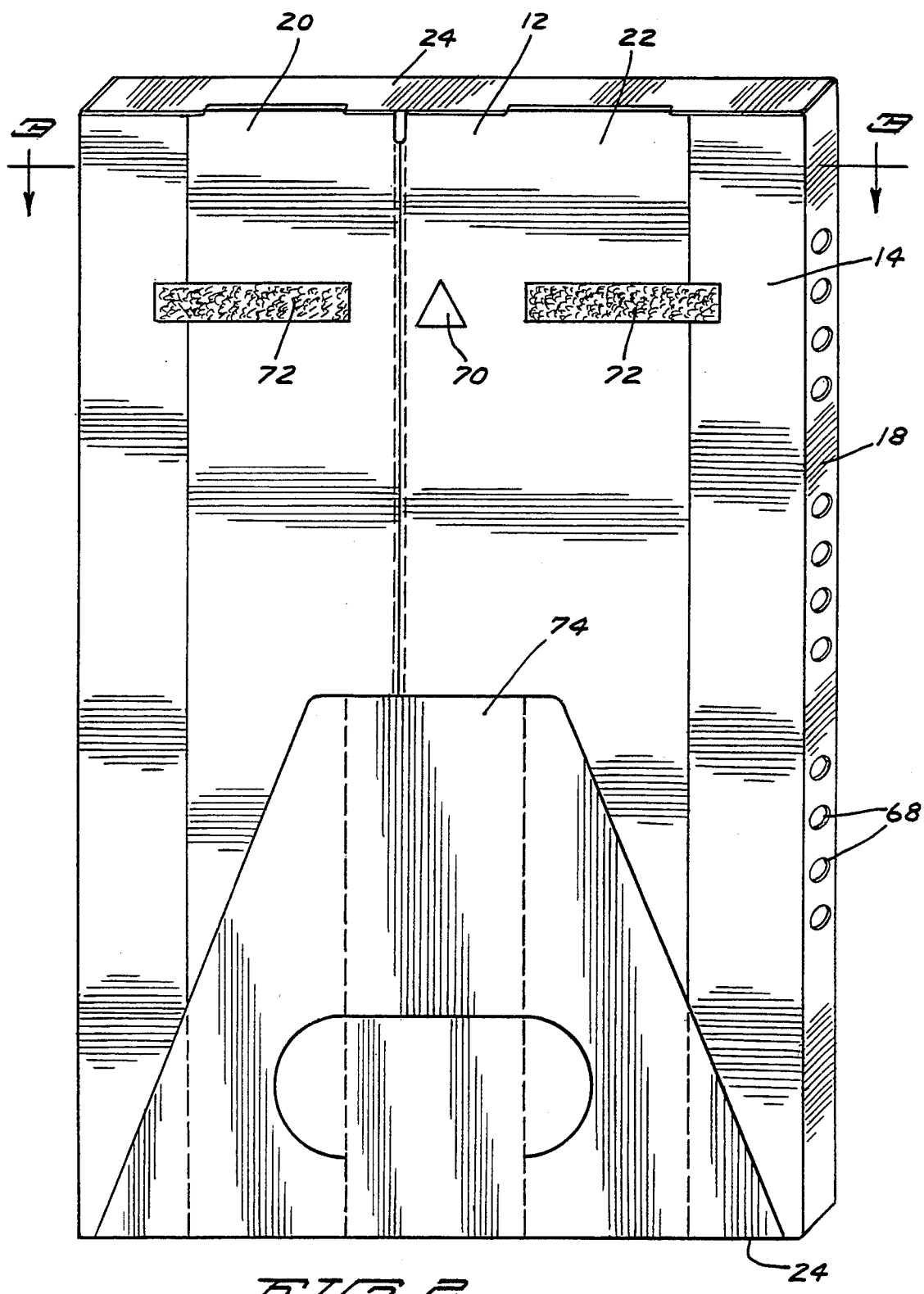

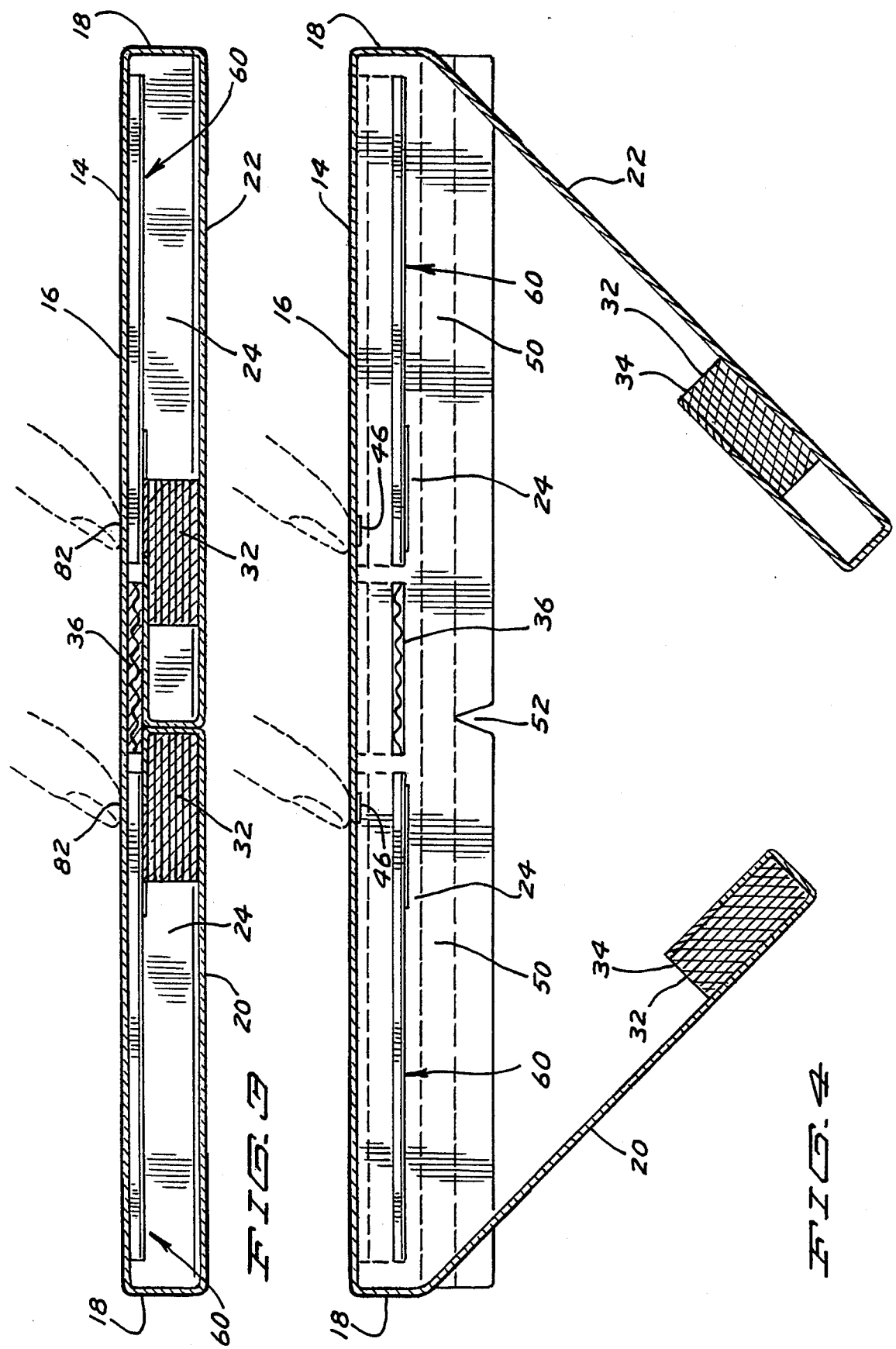

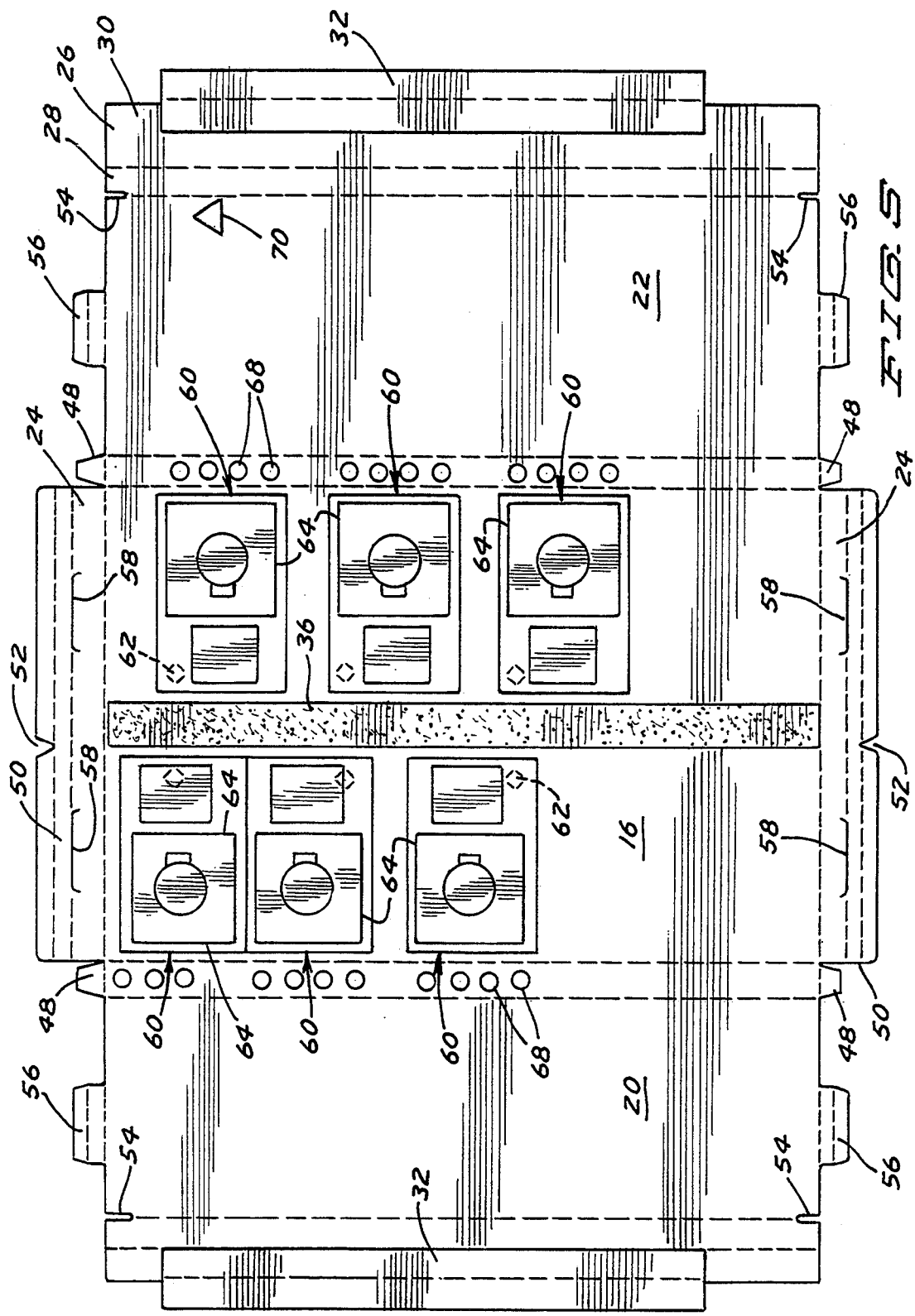

AUDIO INSTRUCTION BOARD

BACKGROUND

The present invention generally relates to display boards, generally to display boards providing audio signals, and particularly to display boards providing instructions in pictorial, written, and audio form.

During production of many products such as the baking of cookies, it is necessary for workers to follow a series of steps in the production process and the success of the ultimate product is often dependent upon the proper completion of each of the steps in the correct order. Instructions must then be conveyed to the workers so they can properly complete the process steps. However, conveying such instructions can be hampered by various conditions including illiteracy, the instructions are not in a language which the worker has working knowledge, the instructions are too small to read because of poor eyesight or are too small to read while the worker is at the work station performing the process steps, and the like. Also the environment of the work station may be detrimental to instructional devices such as in the case of a bakery where flour and other baking ingredients can get into mechanisms resulting in wear and/or failure, can cover visual instructions, or the like.

SUMMARY

The present invention solves these and other problems in the field of instruction boards by providing, in the preferred form, a label formed of thin, flexible, and water resistant material secured to the front of a hollow body and extending over and closing speaker openings formed in the front and which vibrates and acts as a speaker due to air movement within the hollow body caused by vibration of a speaker of a voice module mounted complementary to the speaker opening.

In a preferred aspect of the present invention, the front of the hollow body includes switch openings defining levers integrally extending from the front and pivotable by the deflection of the label also extending over and closing the switch openings.

In the most preferred aspect of the present invention, the label includes written and pictorial presentations providing step by step instructions in the production of a product such as a cookie, where each pictorial presentation is associated with written presentations and audio signals in both English and Spanish.

It is thus an object of the present invention to provide a novel board capable of providing instructions in pictorial, written, and/or audio form.

It is further an object of the present invention to provide such a novel instruction board providing instructions in more than one language.

It is further an object of the present invention to provide such a novel instruction board which can be readily usable at work stations. In this regard, it is an aim of the present invention to have the working mechanisms protected from the elements of the work environment such as flour dust, water, and the like and where the instruction boards can be easily cleaned. Thus, the instruction board can be placed in close proximity to the worker at the work station. It is yet a further aim of the present invention where the audio instructions can be initiated by the worker without a major concern that any product elements on the hands of the worker will hamper the operation. It is further an aim of the present invention where the visual instructions can be easily viewed and understood by the worker in the work station while performing the process steps.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows a rear perspective view of the audio instruction board of FIG. 1.

FIG. 3 shows a cross-sectional view of the audio instruction board of FIG. 1 according to section line 3—3 of FIG. 2.

FIG. 4 shows an exploded, cross-sectional view of the audio instruction board of FIG. 1.

FIG. 5 shows a rear view of the blank forming the audio instruction board of FIG. 1 in a flat, unfolded condition.

Figure 1:
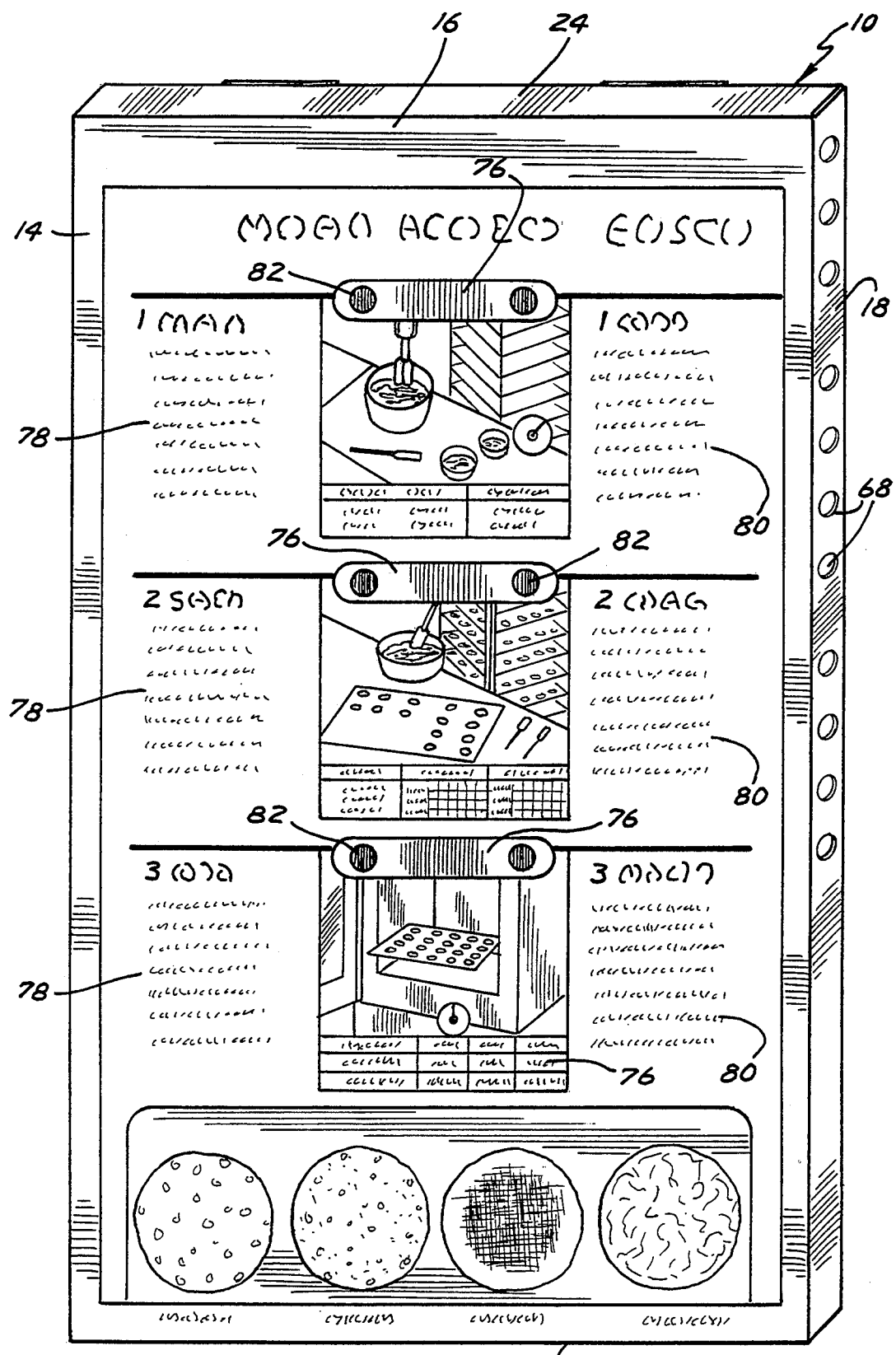
FIG. 1 shows a front perspective view of an audio instruction board according to the preferred teachings of the present invention.
Figure 6:
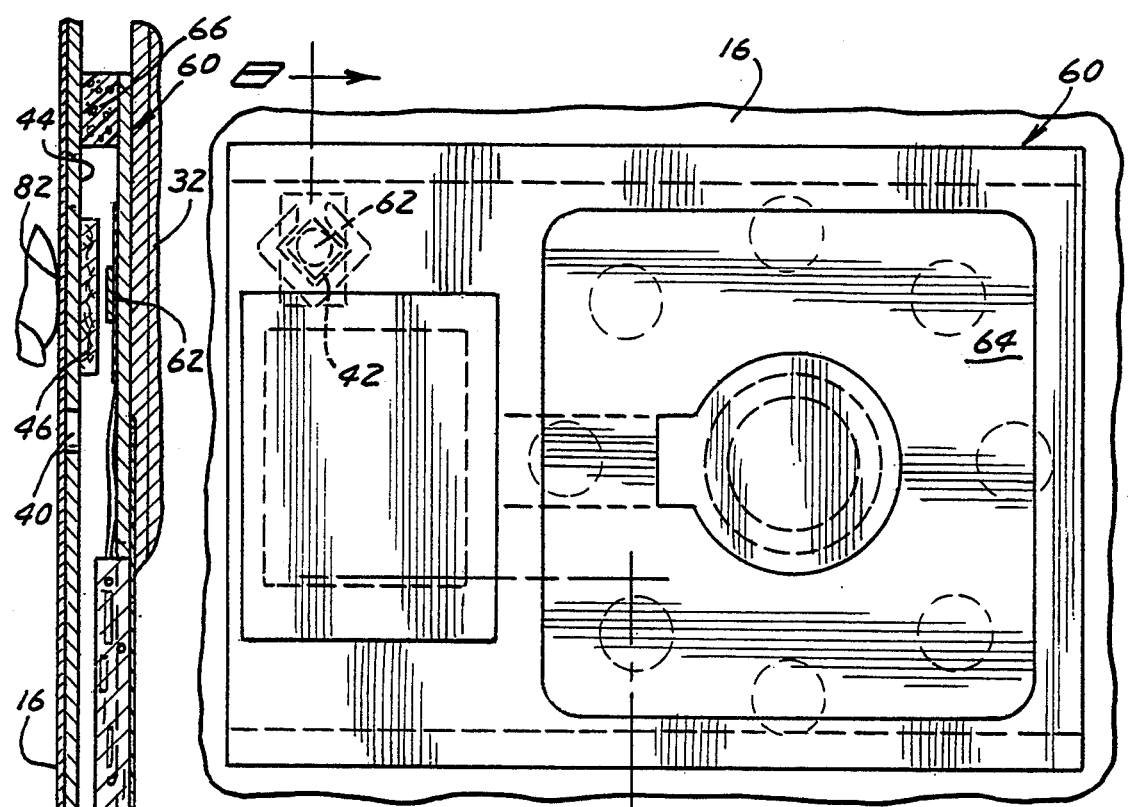
FIG. 6 shows an enlarged rear view of a portion of the blank of FIG. 5 for the audio instruction board of FIG. 1.
Figure 7:
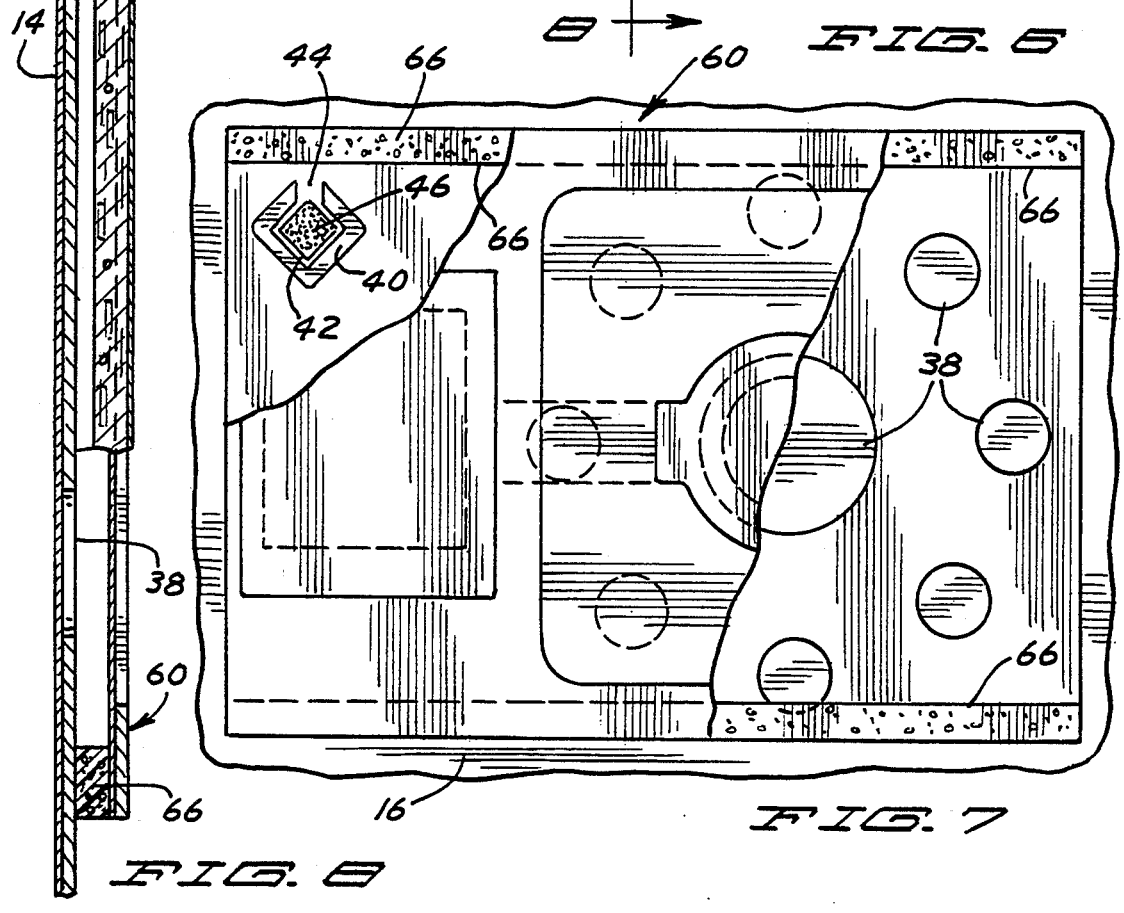
FIG. 7 shows an enlarged rear view of a portion of the blank of FIG. 5 for the audio instruction board of FIG. 1 with portions broken away to expose constructional details.
Figure 8:
FIG. 8 shows a cross-sectional view of the audio instruction board of FIG. 1 according to section line 8—8 of FIG. 6.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "front", "back", "outer", "inner", "upper", "lower", "height", "width", "end", "side", "horizontal", "vertical", and similar terms are used herein, it should be understood that these terms have reference only to the structure shown in the drawings as it would appear to a person viewing the drawings and are utilized only to facilitate describing the invention.

DESCRIPTION

An audio instruction board according to the preferred teachings of the present invention is shown in the drawings and generally designated 10. Generally, board 10 includes a hollow body 12 generally covered by a label 14. In the most preferred form, body 12 is formed from corrugated cardboard and preferably is formed from a single blank. Particularly, body 12 includes a front 16, first and second sides 18 integrally extending generally perpendicular from the opposite side edges of front 16, first and second back panels 20 and 22 integrally extending generally perpendicular from sides 18, and a top and bottom 24 integrally extending generally perpendicular from the top and bottom edges of front 16. The free side edges of each back panel 20 and 22 include an integral, generally L-shaped extension 26.. Each extension 26 includes a first leg 28 integrally extending generally perpendicular from the side edge of back panels 20 and 22 and having a width generally equal to but slightly smaller than the widths of sides 18. Each extension 26 further includes a second leg 30 integrally extending generally perpendicular from the opposite edge of leg 28 parallel to the respective panels 20 and 22 towards sides 18 and intermediate front 16 and back panels 20 and 22.

Body 12 further includes first and second housing spacers 32 formed in the preferred form from adhered, stacked layers of corrugated cardboard 34 and generally extending between and holding front 16 and back panels 20 and 22 in a spaced, parallel relation. In the most preferred form, the front layer 34 of spacers 32 is of a smaller width than the remaining layers 34 of spacers 32 and has a thickness generally equal to that of legs 30 of extensions 26. The back surface of legs 30 can then be secured to the second layers 34 of spacers 32 with the free edge thereof abutting with the front layer 34 of spacers 32. Body 10 further includes a central spacer 36 secured generally equidistant between sides 18 and to the back or inner surface of front 16. The back of hollow body 12 is parallel to front 16 and is formed by panels 20 and 22 with back panel 22 having a width greater than back panel 20 in the most preferred form and with the combined widths of panels 20 and 22 being equal to the width of front 16. The front surface of leg 30 of extension 26 of panel 22 is secured to the back surface of spacer 36.

Front 16 further includes multiple sets of speaker openings 38 which in the most preferred form are arranged in two vertical columns parallel to and spaced from spacers 32 and 36. Each set of openings 38 can be in the form of multiple small circular openings arranged in a circle concentric with a larger circular opening as shown or can be in the form of a single large opening of any desired shape. Front 16 further includes multiple sets of switch leverage openings 40 associated with each set of speaker openings 38. Openings 40 are also arranged in two vertical columns parallel to and intermediate openings 38, parallel to and spaced from spacer 36 and generally overlying legs 30 of extensions 26 and/or spacers 32. Openings 40 are generally U-shaped to define an enlarged head 42 integrally connected by a lever or tab 44 to the remaining portions of front 16. In the most preferred form, head 42 is generally square in shape and tab 44 extends generally diagonally from a corner of head 42. A relatively rigid spacer 46 such as formed from a black, dense polymer is secured to and carried by the back surface of head 42 and is of a size substantially equal to but slightly smaller than head 42.

For purposes of closing body 12, each of the upper and lower edges of sides 18 include integral dust flaps 48 pivotal inwardly. Top and bottom 24 each include integral closure flaps 50 having a V-shaped notch 52 located complementary to and for receipt of legs 28, with notch 52 extending approximately one half of the width of flaps 50. Slots 54 for slideably receiving flaps 50 are formed at the interconnection of legs 28 to back panels 20 and 22 and have a depth generally equal to the spacing between notches 52 and top and bottom 24. Thus closure flaps 50 are slideably received generally parallel to panels 20 and 22 with flaps 50 slideably received in slots 54 and legs 28 below slots 54 positioned within notches 52. The upper and lower edges of each panel 20 and 22 include a tab 56 slideably received in a slot 58 formed at the interconnection of top and bottom 24 to closure flaps 50.

Board 10 further includes multiple voice modules 60 associated with each set of openings 38 and 40. Voice modules 60 in the preferred form are in the form of a panel of standard design such as supplied by Intervisual Communications, Inc. and generally include a pressure actuated switch 62, a speaker 64, and a suitable microprocessor. Voice modules 60 are secured to the back or inner face of front 16 in a slightly spaced condition such as by parallel, spaced strips 66 such as of double sided adhesive foam tape located along the upper and lower, parallel, periphery edges of each module 60. Module 60 is positioned such that spacer 46 is located complementary to switch 62 and openings 38 are located complementary to speaker 64 of each module 60. In the most preferred form, strips 66 have a thickness generally equal to the thickness of spacers 46, the thickness of spacer 36 is generally equal to the combined thickness of strips 66 and voice modules 60, and the thickness of spacer 36 and the width of legs 28 combined is generally equal to the width of sides 18.

Label 14 is formed of any suitable, thin, flexible material which is generally waterproof or water resistant and can be formed of any suitable material such as but not limited to paper, polymers, or blends thereof. Label 14 in the preferred form is secured to and covers the outer surfaces of front 16, sides 18, top and bottom 24, dust flaps 48, closure flaps 50 and partially onto back panels 20 and 22. Label 14 extends over, closes, and seals speaker and switch openings 38 and 40.

Board 10 further includes air vent holes 68 extending through label 14 and sides 18 and in air communication with the interior of body 12 behind voice modules 60.

Suitable provisions for holding body 12 in a generally vertical condition can be provided, with three independent types being provided in the most preferred form. Specifically, an opening 70 can be cut exclusively in back panel 22 on the longitudinal balance line of body 12 for receipt of a nail or similar hanging hook. Hook and loop fasteners 72 can be utilized including one strip secured to the outer face of panels 20 and 22 and the other strip having adhesive (covered by a removable covering) for adhering to a wall or like vertical surface. A foldable easel 74 can be secured to panels 20 and 22 which is foldable from a flat condition parallel to and abutting with panels 20 and 22 and a three dimensional condition allowing body 12 to stand generally vertically on bottom 24. In the most preferred form, easel 74 spans between and interconnects panels 20 and 22, with panel 20 being secured to front 16 by its interconnection through easel 74 to panel 22 having extension 26 secured to front 16 through spacer 36.

Now that the basic construction of instruction board 10 according to the preferred teachings of the "present invention has been explained, the operation and a preferred manner of use can be set forth and appreciated. Particularly, in the preferred form, instruction board 10 is utilized to step-by-step instruct a worker on the preparation of a baked product such as cookies. Label 14 includes multiple pictorial presentations 76 arranged in a column on front 16 intermediate sides 18 and with one associated with each pair of voice modules 60. First and second written presentations 78 and 80 are also associated with each pictorial presentation 76 and are located on opposite sides thereof, with presentations 78 being in one language such as English and presentations 80 being in another language such as Spanish. It should further be appreciated that label 14 includes suitable indicia 82 overlying head 42 and spacer 46 of each opening 40, with one voice module 60 associated with each pictorial presentation 76 being in the same language as presentations 78 and the other voice module 60 being in the same language as presentations 80. In the most preferred form, the top pictorial presentation 76 and associated presentations 78 and 80 and voice modules 60 then provide instructions for the first step in the production of cookies. The next pictorial presentation 76 below the top pictorial presentation 76 and its associated presentations 78 and 80 and voice modules 60 provide instructions for the second step in the production of cookies, and so forth.

In use, board 10 according to the preferred teachings of the present invention is held in a generally vertical condition at the work station utilizing opening 70, fasteners 72, or easel 74 depending upon the particular work station, with board 10 thus providing a wide variety of mounting options to the worker. The worker can then look at and follow the first pictorial presentation 76 and the written presentations 78 and 80 of the worker's choice depending upon the language of most familiarity. Also, if an audio signal is desired, the voice module 60 for the first pictorial presentation 76 can be actuated by pushing label 14 inwardly on the indicia 82 of the worker's choice depending upon the language of most familiarity. After the instructions of the first pictorial presentation 76 have been carried out, the worker can then look at and follow the instructions of the next pictorial presentation 76 and associated written presentations 78 or 80 and actuate voice module 60 if desired and so forth until the production of the cookies has been completed.

It should then be noted that label 14 does not include any openings or other cuts on the face of front 16. Thus, openings 38 and 40 of body 12 are covered such that dust, flour, or other baking ingredients, and the like in the environment of the working station can not enter body 12 therethrough. Although vent holes 68 are provided, they are located in sides 18 and are less likely to be exposed to the elements than the outer face of front 16 which is touched by the hands of the worker in pointing or following the written and/or pictorial presentations 76, 78, and 80, or in actuating switches 62 of modules 60, and which is otherwise subjected to splashing of the baking ingredients thereon. Furthermore, in the event that contamination by elements from the environment such as flour should occur, the face of front 16 can be simply wiped clean utilizing a damp cloth, with label 14 also preventing the passage of moisture to voice modules 60.

In addition to enclosing switches 62 and preventing entry of elements of the environment, label 14 provides the elasticity to return heads 42 and spacers 46 to its open position. Specifically, when a particular voice module 60 is desired to be actuated, the finger of the worker (which may be covered with baking ingredients) is positioned on the corresponding indicia 82 of label 14. When pushed, label 14 will stretch and deflect inside of switch opening 38 causing head 42 to also pivot about tab 44 inwardly. Spacer 46 carried by head 42 opposite to label 14 moves toward and engages switch 62 actuating voice module 60. After release of the pressure from label 14, label 14 will return to its unstretched and nondeflected condition. As head 42 is adhered to label 14, head 42 and spacer 46 secured thereto will move with label 14 away from switch 62.

It should also be noted that spacers 32 provide anvils or pressure plates against which switches 62 abut, with switches 62 being sandwiched between spacers 32 and 46 when actuated. Thus, spacers 32 prevent front 16 and voice modules 60 secured thereto from simply deflecting inwardly when a particular switch 62 was desired to be actuated.

According to the teachings of the present invention, label 14 stretched over speaker openings 38 vibrates with speakers 64 of voice modules 60 and thus itself acts as a speaker. Specifically, speakers 64 are held relatively close to and parallel to label 14 and due to the restricted air passage from between front 16 and voice modules 60 provided by strips 66, the vibration of speakers 64 will move the air between speakers 64 and label 14 causing label 14 covering openings 38 to vibrate. Thus, label 14 acts as a speaker especially for high frequency sounds. Vent holes 68 allow the lower frequency sounds caused by the air moving between speakers 64 and back panels 20 and 22 to pass therethrough. It should be noted that high frequency sounds have difficulty in passing out vent holes 68 but generally come from the front by label 14 and speakers 64.

Thus board 10 according to the preferred teachings of the present invention is particularly useful in connection with providing instruction for the production of products such as cookies. However, board 10 according to the teachings of the present invention can be adapted for other applications where pictorial, written, and/or audio instructions or signals are desired.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Audio instruction board comprising, in combination: a hollow body including a front having outer and inner surfaces; a label secured over the outer surface of the front, with the label formed from thin, flexible, and water-resistant material allowing the outer surface of the front to be wiped with a damp cloth; and at least first means for providing an audio signal, with each of the audio signal providing means including a voice module having a speaker and a switch, a speaker opening formed in the front of the hollow body, and means for mounting the voice module, with the audio signal providing means further including the label extending over and closing the speaker opening and acting as a speaker due to the label vibrating by the air movement within the hollow body caused by the vibration of the speaker of the voice module when actuated by the switch.

2. Audio instruction board comprising, in combination: a hollow body including a front having outer and inner surfaces and including first and second sides extending generally perpendicular to the front; a label secured over the outer surface of the front, with the label formed from thin, flexible, and water-resistant material allowing the outer surface of the front to be wiped with a damp cloth; at least first means for providing an audio signal including a voice module having a speaker and a switch, a speaker opening formed in the front of body, and means for mounting the voice module to the front inside of the hollow body; and vent holes formed in the sides of the hollow body allowing lower frequency sounds to pass therethrough.

3. The audio instruction board of claim 2 wherein the hollow body further includes a back having first and second back panels arranged generally parallel to the front, with the second back panel having a width greater than the width of the first back panel, and with the combined widths of the first and second back panels being equal to the width of the front; and wherein the audio instruction board further comprises, in combination: means for hanging the hollow body on a vertical surface, with the hanging means located exclusively on the second back panel and on the longitudinal balance line of the hollow body.

4. The audio instruction board of claim 3 wherein each of the audio signal providing means further comprises, in combination: a switch opening formed in the front of the hollow body, with the label extending over and closing the switch opening, with the switch of the voice module being a pressure actuated switch, with the label being deflectable inside of the switch opening to actuate the switch.

5. The audio instruction board of claim 4 wherein the switch opening is generally U-shaped defining a lever integrally extending from the front into the switch opening and terminating in a head, with the deflection of the label causing the head to pivot about the lever to actuate the switch.

6. The audio instruction board of claim 5 further comprising, in combination: a relatively rigid spacer secured to the head opposite the label, with the relatively rigid spacer engaging the switch when the head and label are deflected.

7. The audio instruction board of claim 6 further comprising, in combination: a housing spacer extending between the front and the back for holding the front and back at a spaced, parallel relation, with the switch being sandwiched during actuation between the housing spacer and the relatively rigid spacer.

8. The audio instruction board of claim 7 wherein each of the first and second back panels include an integral L-shaped extension having a first leg integrally extending generally perpendicular from the back panel and a second leg integrally extending generally perpendicular from the first leg and intermediate the front and the back panel, with the housing spacer being secured to the second leg of the L-shaped extension.

9. The audio instruction board of claim 8 wherein the hollow body is formed of a single blank of corrugated cardboard, and wherein the housing spacer is formed of adhered, stacked layers of corrugated cardboard.

10. Audio instruction board comprising, in combination: a hollow body including a front having outer and inner surfaces, a label secured over the outer surface of the front; multiple means for providing an audio signal, with each audio signal providing means including a voice module having a speaker and a switch, a speaker opening formed in the front of the hollow body, and means for mounting the voice module to the front inside of the hollow body; multiple means on the label for providing pictorial presentations; and multiple means on the label for providing written presentations.

11. Audio instruction board comprising, in combination: a body including a front having an outer surface; a label secured over the surface of the front; multiple means for providing an audio signal mounted to the front; multiple means on the label for providing written presentations; and at least a first on the label for providing a pictorial presentation; wherein two written presentation providing means and two audio signal providing means are associated with each pictorial presentation providing means, with one of the written presentation providing means and one of the audio signal means being in a first language and the other of the written presentation providing means and the other of the audio signal means being in another language.

12. The audio instruction board of claim 11 wherein the written and pictorial presentation providing means and the audio signal providing means are located in parallel columns, with the pictorial presentation providing means being provided in a single column located intermediate first and second columns of written presentation providing means and of first and second columns of audio signal providing means.

13. Audio instruction board comprising, in combination: a hollow body including a front having outer and inner surfaces; and at least first means for providing an audio signal including a voice module, a speaker opening formed in the front of the hollow body, wherein the voice module is in the form of a panel having first and second parallel periphery edges, and first and second strips secured to the inner surface of the front and the first and second periphery edges of the voice module for mounting the voice module to the hollow body.

14. The audio instruction board of claim 13 wherein the first and second strips comprise double-sided foam tape.

15. Audio instruction board comprising, in combination: a hollow body including a front having outer and inner surfaces; a label secured over the outer surface of the front; and at least first means for providing an audio signal, wherein each of the audio signal providing means comprises, in combination: a voice module having a switch, and a switch opening formed in the front of the hollow body, with the label extending over and closing the switch opening, with the switch of the voice module being a pressure actuated switch, with the label being deflectable inside of the switch opening to actuate the switch which is mounted within the hollow body and aligned with the switch opening.

16. The audio instruction board of claim 15 wherein the switch opening is generally U-shaped defining a lever integrally extending from the front into the switch opening and terminating in a head, with the deflection of the label causing the head to pivot about the lever to actuate the switch.

17. The audio instruction board of claim 16 further comprising, in combination: a relatively rigid spacer secured to the head opposite the label, with the relatively rigid spacer engaging the switch when the head and label are deflected.

18. The audio instruction board of claim 17 wherein the hollow body further includes a back; and wherein the audio instruction board further comprises, in combination: a housing spacer extending between the front and the back for holding the front and back at a spaced, parallel relation, with the switch being sandwiched during actuation between the housing spacer and the relatively rigid spacer.

19. The audio instruction board of claim 18 wherein the back has first and second back panels arranged generally parallel to the front, with the combined widths of the first and second back panels being equal to the width of the front; and wherein each of the first and second back panels include an integral L-shaped extension having a first leg integrally extending generally perpendicular from the back panel and a second leg integrally extending generally perpendicular from the first leg and intermediate the front and the back panel, with the housing spacer being secured to the second leg of the L-shaped extension.

20. Audio instruction board comprising, in combination: a hollow body having a front having outer and inner surfaces; a label secured over the outer surface of the front, with the label formed from thin, flexible, and water-resistant material allowing the outer surface of the front to be wiped with a damp cloth; and at least first means for providing an audio signal including a voice module having a speaker and a switch, a speaker opening formed in the front of the hollow body, and means for mounting the voice module with the label extending over and closing the speaker opening; and wherein the hollow body further includes a back; and wherein the audio instruction board further comprises, in combination: means for hanging the hollow body on a vertical surface comprising, in combination: a first strip of hook fasteners; and a second strip of loop fasteners for removable securement with the first strip, with one of the first and second strips secured on the back of the hollow body and the other of the first and second strips including adhesive for securement to the vertical surface.

* * * * *

UNITED STATES PATENT AND TRADEMARK OFFICE
CERTIFICATE OF CORRECTION

PATENT NO. : 5,360,345

DATED : November 1, 1994

INVENTOR(S) : Arne H. Brauner, James E. Kelley

It is certified that error appears in the above-identified patent and that said Letters Patent is hereby corrected as shown below:

Col. 4, line 63; "the "present" should be -- the present --;

Col. 7, line 9; "of body" should be -- of the hollow body --;

Col. 8, line 7; "the surface" should be -- the outer surface --;

Col. 8, line 10; "first on" should be -- first means on --.

Signed and Sealed this

Twenty-fifth Day of April, 1995

Attest:

BRUCE LEHMAN

Attesting Officer

Commissioner of Patents and Trademarks